United States Patent

[11] 3,571,858

| [72] | Inventor | George F. McGowan |
| | | 4509 Forest, Kansas City, Mo. 64116 |
| [21] | Appl. No. | 764,556 |
| [22] | Filed | Oct. 2, 1968 |
| [45] | Patented | Mar. 23, 1971 |

[54] FLAT SPRING DENTAL COMPRESS
4 Claims, 5 Drawing Figs.

| [52] | U.S. Cl. | 18/33 |
| [51] | Int. Cl. | A61c 13/00 |
| [50] | Field of Search | 18/33 |

[56] References Cited

UNITED STATES PATENTS

| 507,980 | 11/1893 | Barrett | 18/33 |
| 3,267,525 | 8/1966 | McGowan | 18/33 |

FOREIGN PATENTS

| 986,416 | 3/1951 | France | 18/33 |

Primary Examiner—H. A. Kilby, Jr.
Attorney—Schmidt, Johnson, Hovey and Williams

ABSTRACT: A curing clamp for a dental flask employs a flask-engaging pressure plate provided with a pair of spaced pillars upon which a flat bar of spring steel rests. Force is applied to the plate by a center screw that engages the spring bar and is centered with respect to the pillars.

PATENTED MAR 23 1971 3,571,858

INVENTOR
George F. McGowan

BY Schmidt, Johnson, Hovey,
Williams & Bradley.
ATTORNEYS.

FLAT SPRING DENTAL COMPRESS

Dental flasks of the type, for example, shown in my U.S. Pat. Nos. 2,899,707 and 2,975,479 are employed in the manufacture of dental appliances to contain the denture and an investment material during uniting of the artificial teeth and the plastic plate portion of the denture by the application of heat. Since the steps of the various techniques of prosthetic dentistry are well known to those skilled in the art and are outlined in the aforesaid patents, such techniques will not be discussed in detail herein.

A handpress is commonly employed to close the flask prior to curing. During the curing process, a curing clamp is utilized to hold the sections of the flask together as the same are subjected to the heat of a curing vat. As discussed in my U.S. Pat. No. 3,267,525, problems are encountered with the finished denture product if closing of the flask and subsequent clamping during curing thereof is improperly effected. In particular, an open bite configuration may be imparted to the finished denture if evenly distributed forces are not produced by the press and curing clamp utilized. U.S. Pat. No. 3,267,525 is directed to the provision of a handpress and curing clamp of novel design which precludes the formation of an open bite denture.

Although the press and clamp structure disclosed in U.S. Pat. No. 3,267,525 has proven to be highly satisfactory, it is desirable, if possible, to utilize a spring action compress in the curing of dentures since the heat of the curing vat necessarily causes expansion of the various metal parts of the flask and the clamp. The use of springs to apply the holding force to the flask has the advantage of compensating for the expansion produced by heat. To this end, my copending application, Ser. No. 576,722, filed Sept. 1, 1966, and entitled "Spring Action Dental Compress" now U.S. Pat. No. 3,411,184, discloses a curing clamp in which the force applied by the springs is automatically equalized, regardless of any variations which might exist in the relative strengths of the springs, thereby eliminating a major objection to prior spring action clamps where there was no assurance that the force applied by each spring would be of the same magnitude.

Although the clamp disclosed in the aforesaid application does possess the important advantage of assuring that each spring will apply the same holding force, it is always desirable to provide a clamp of as simple a design as possible in order to minimize cost and eliminate the number of parts that might be subject to wear and deterioration. Coil springs are inherently subject to deterioration by crystallization or rust rot, which will rapidly occur since the springs are constantly subjected to boiling water and steam in the curing process.

It is, therefore, the primary object of this invention to provide a spring action dental compress in which the applied holding forces are automatically equalized, and yet which is of ultimate structural simplicity.

As a corollary to the foregoing object, it is an important aim of this invention to provide such a compress which possesses the advantages of spring action, and yet effects the application of holding forces to the flask without utilizing coil springs as force-transmitting elements.

Further, it is an objective of the invention to provide an improved spring action compress as above having a leveling plate for the flask which prevents the latter from being subjected to unequal heating when the compress is placed in a curing vat.

Figure 1:
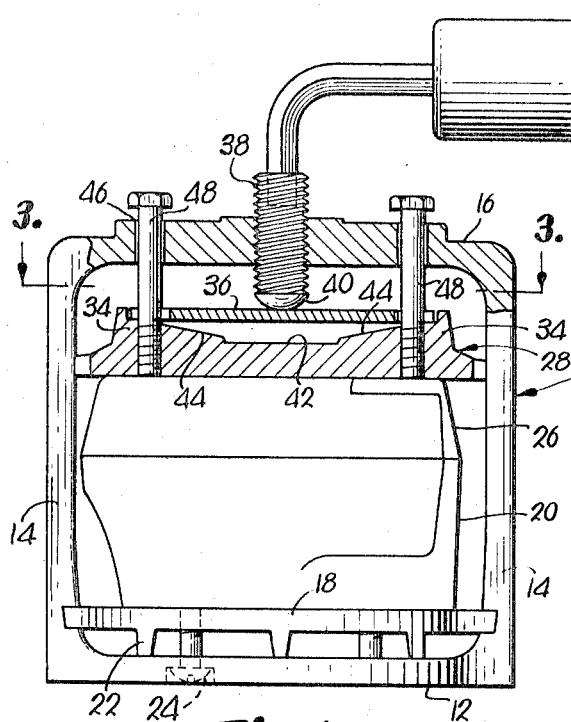
FIG. 1 is a front elevational view of the compress showing a dental flask in place therein and illustrating a tool for rotating the center screw, the pressure plate and the spring bar being shown in cross section.
Figure 2:
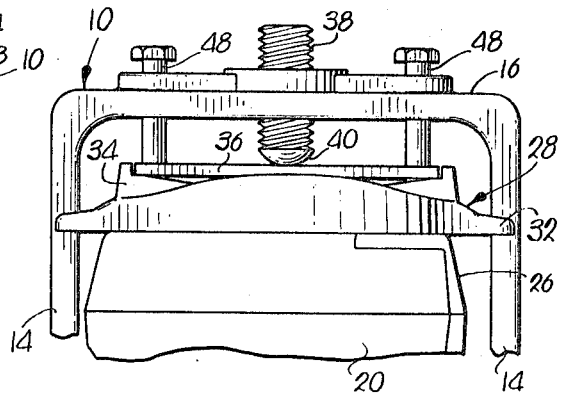
FIG. 2 is a fragmentary, front elevational view similar to FIG. 1.

A closed, rectangular frame 10 includes a bed 12 of generally circular configuration as viewed in a horizontal plane, a pair of spaced, parallel standards 14 integral with bed 12, and a beam 16 interconnecting the upper ends of standards 14. A leveling plate 18 cooperates with the bed 12 to form a base upon which the lower section 20 of a two-section dental flask rests, leveling plate 18 being provided with three pairs of feet 22 which engage the upper surface of bed 12 and maintain the main body of the leveling plate 18 spaced above the bed 12. A pair of threaded fasteners 24 extend upwardly through bed 12 and are threaded into plate 18 to hold the latter securely in place on the bed.

Figure 3:
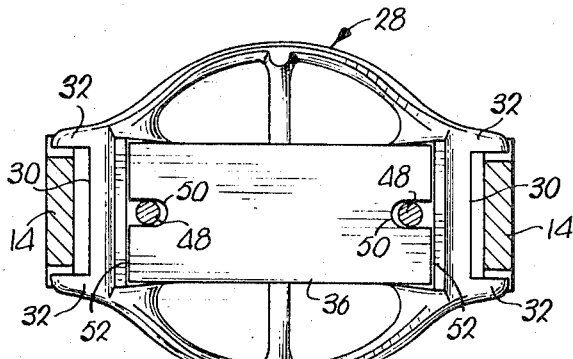
FIG. 3 is a horizontal sectional view taken along line 3—3 of FIG. 1.
Figure 4:
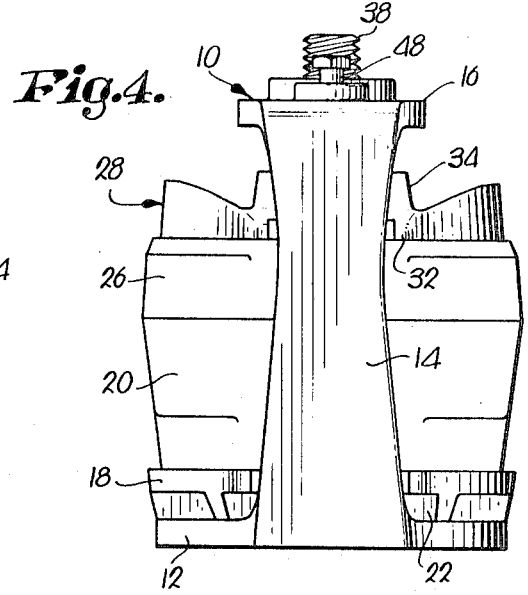
FIG. 4 is an end view of the structure shown in FIG. 1.
Figure 5:
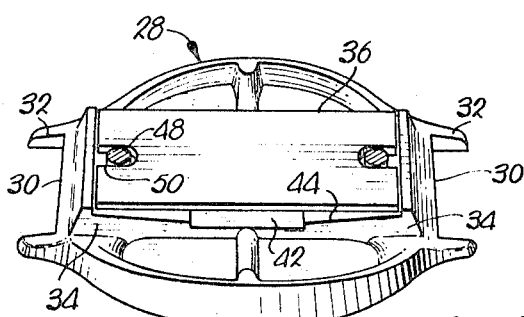
FIG. 5 is a top, perspective view of the pressure plate and spring bar.

The upper section of the dental flask is designated 26, the two sections 20 and 26 being held together under clamping force applied to the upper surface of section 26 by a pressure plate 28. As is clear in FIGS. 3 and 5, the pressure plate 28 is of generally circular configuration with opposed, straight edges 30. Each of the edges 30 extends between a pair of laterally extending projections 32 partially embracing a corresponding standard 14.

A pair of spaced shoulders 34 are integrally formed on the top of pressure plate 28 adjacent respective edges 30, the two shoulders 34 presenting a pair of pillars upon which a flat, resilient bar 36 rests. The bar 36 is preferably of spring steel and serves as a force-transmitting member between a center screw 38 and the shoulders or pillars 34. The center screw 38 is threaded vertically through the beam 16 and has a rounded lower tip 40 which is engageable with a central zone of the bar 36 directly between the pillars 34 in equidistant relationship thereto.

Furthermore, the pillars 34 are equidistant from a central portion 42 of the plate 28, it being particularly clear in FIG. 1 that the spring bar 36 spans the pillars 34 in spaced relationship to the central portion 42 of the plate 28. Additionally, a pair of inclined surfaces 44 are presented by the top of pressure plate 28 between the central portion 42 thereof, and respective pillars 34, thereby providing clearance between the bar 36 and the top of the plate 28 except at the areas of contact of the bar 36 with the pillars 34.

A pair of openings 46 in the beam 16 permit the shanks of a pair of guide elements or bolts 48 to extend through the beam 16 and downwardly therefrom where the threaded lower end portions of the shanks are received by corresponding tapped holes in the respective shoulders or pillars 34. The spring bar 36 has a pair of clearance slots 50 therein receiving respective elements 48, each of the slots 50 communicating with a corresponding end 52 of the bar 36.

In use, the compress is placed in a suitable bench mount assembly such as shown and described in my U.S. Pat. No. 3,267,525. After the flask has been closed and packed (which may be effected by a center screw handpress), the flask is placed on leveling plate 18 with the pressure plate 28 in overlying engagement with the upper flask section 26. The center screw 38 is then tightened, the tip 40 thereof being brought into engagement with the spring bar 36 to flex the latter. If desired, a tool such as illustrated at 54 in FIG. 1 may be employed to advance the center screw 38.

As the center screw 38 is advanced downwardly, it may be appreciated that the bar 36 is forced to flex downwardly partially into the recess formed by the central portion 42 and the inclined surfaces 44 of the pressure plate 28. Since the axis of the screw 38, and hence the zone of engagement thereof with the bar 36, is centered with respect to the pillars 34, equal forces are thus applied to the pillars 34 and are transmitted to the flask by the pressure plate 28. In this respect, it should be noted that the pillars 34 are in substantial alignment with opposed portions of the sidewalls of the flask. This not only serves to direct the holding forces downwardly through the sidewalls of the flask, but also prevents disproportionate expansion of the flask as the latter is heated during the curing process. Were it not for the edge or peripheral clamping effect provided by alignment of the pillars 34 with the sidewalls of the flask, the sidewalls upon heating would be allowed to expand out of proportion to the central portion of the flask, thereby tending to cause the denture to assume an undesired, open bite configuration. With the instant invention, however, expansion is uniform and is not materially hindered since the bar 36 flexes to compensate for the expansion.

It is noteworthy that the leveling plate 18, besides its customary functions of providing a flat, upper face for the flask to rest upon and serving as the cover plate of the two-section flask illustrated, also maintains the flask out of direct contact with the heating element normally employed in a curing vat. The heating element is at the bottom of the vat and, if it were not for the space established by the feet 22 between the main body of the leveling plate 18 and the bed 12, the heat of the element would be directly conducted to the flask when the latter (in the clamp) is lowered into the vat. Thus, the spacing between the leveling plate 18 and the bed 12 permits the water in the curing vat to readily circulate beneath the flask in order to improve the distribution of the applied heat.

If desired, the compress of the instant invention could be modified to serve as a combination handpress and curing clamp by extending the lengths of the standards 14 so that an unclosed flask could be placed between the pressure plate 28 and the leveling plate 18. This, of course, would also require that the guide elements 48 be provided with shanks of correspondingly increased lengths, and that the length of the center screw 38 be likewise increased. During use of the combination device as a press to close and pack the flask, the spring bar 36 would be removed so that the center screw 38 would engage the central portion 42 of the pressure plate 28. The slots 50 in the ends of the bar 36 would facilitate removal and reinstallation of the bar 36 for rapid conversion of the combination device.

I claim:

1. A compress for a sectional dental flask having sections closed upon one another and defining investment retaining, peripheral sidewalls of the flask, said compress comprising:
    a base;
    a beam spaced from said base, the latter being adapted to support said flask between the base and the beam;
    means interconnecting said base and said beam;
    a pressure plate between said base and said beam;
    a pair of spaced pillars on said plate extending away from said base;
    a resilient, force-transmitting member spanning said pillars and spaced from said plate;
    pressure means on said beam engageable with said member intermediate said pillars to flex the member and force the plate against one of the sections of the flask, when the latter is on the base, with the pillars in substantial alignment with opposed portions of said sidewalls;
    said plate having means engageable with said one section adjacent the periphery thereof to transmit the applied force directly to said sidewalls as the member is flexed by the pressure means;
    said plate having a central portion;
    said pillars being disposed substantially equidistant from said central portion of the plate and adjacent opposed edges thereof; and
    said member extending across said central portion of the plate in spaced relationship thereto.

2. A compress as claimed in claim 1, said pressure means being engageable with said member at a zone thereof centered with respect to said pillars.

3. A compress as claimed in claim 1, said plate being provided with a pair of shoulders presenting respective pillars, said member comprising a flat, spring bar resting on said shoulders.

4. A compress as claimed in claim 3:
    said beam having a pair of spaced openings therein aligned with respective shoulders;
    a pair of guide elements projecting from responsive shoulders and extending through corresponding openings for movement of the plate toward and away from the base and to prevent separation of the plate from the beam when the flask is removed from the compress; and
    said bar having a pair of opposed ends and a pair of clearance slots communicating with respective ends and receiving corresponding elements.